(12) United States Patent
Roden (10) Patent No.: US 8,620,966 B2
(45) Date of Patent: Dec. 31, 2013

(54) NETWORK CONTENT MODIFICATION

(75) Inventor: Barbara Roden, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 348 days.

(21) Appl. No.: 11/859,120

(22) Filed: Sep. 21, 2007

(65) Prior Publication Data

US 2009/0083274 A1    Mar. 26, 2009

(51) Int. Cl.
*G06F 17/30* (2006.01)
*G06F 7/00* (2006.01)
*G06Q 30/00* (2012.01)

(52) U.S. Cl.
USPC ................ 707/803; 707/711; 705/14.49

(58) Field of Classification Search
None
See application file for complete search history.

(56) References Cited

U.S. PATENT DOCUMENTS

| | | | |
|---|---|---|---|
| 2004/0123327 A1* | 6/2004 | Fai Ma et al. | 725/100 |
| 2006/0074751 A1* | 4/2006 | Kline et al. | 705/14 |
| 2006/0080591 A1* | 4/2006 | Huang et al. | 715/500.1 |
| 2008/0097830 A1* | 4/2008 | Kim | 705/10 |
| 2008/0244644 A1* | 10/2008 | McCausland | 725/37 |
| 2008/0276266 A1* | 11/2008 | Huchital et al. | 725/32 |
| 2009/0046584 A1* | 2/2009 | Garcia et al. | 370/233 |
| 2009/0064247 A1* | 3/2009 | Biniak et al. | 725/105 |
| 2009/0070190 A1* | 3/2009 | Gorty et al. | 705/10 |

* cited by examiner

*Primary Examiner* — Pierre Vital
*Assistant Examiner* — Berhanu Mitiku
(74) *Attorney, Agent, or Firm* — Hartman & Citrin LLC (57) ABSTRACT

Methods, systems, and computer-readable media provide for the modification of network source content. According to various embodiments described herein, source content that includes primary source content and secondary source content is received via a network. Secondary source content is identified for modification. Insertion content is identified for use in modifying the secondary source content. The secondary source content is then modified prior to providing the modified source content to a user device for presentation to a user. Content management criteria that may include provider agreements, user preferences, and a user profile may be used in the content modification procedure.

15 Claims, 5 Drawing Sheets

NETWORK CONTENT MODIFICATION

TECHNICAL FIELD

This application relates generally to the field of providing network content. More specifically, the disclosure provided herein relates to the field of modifying content received via a network to remove content or to insert additional content.

BACKGROUND

People commonly access and exchange various types of information between devices connected via a network. A common example of a public network is the Internet. People have access to seemingly endless quantities of information on the World Wide Web (Web) via the Internet. Using a Web browser on a computing device, a person may view a document, or Web page, that contains any amount of text, images, audio, video, and other media. To view a Web page, a person typically begins by entering a uniform resource locator (URL) associated with the desired Web page into a Web browser, or by following a hypertext link to the Web page. In either situation, the Web browser establishes a connection with the server and requests the content of the Web page from the corresponding Web server. All text, images, video, audio, and other media associated with the requested Web page are retrieved and used by the Web browser to render the Web page.

In many cases, content that is retrieved or accessed by a person over a network includes information in the form of text, images, video, audio, and other media that is secondary to the desired information. For example, a person might enter a URL into a Web browser, or click on a hypertext link, in order to read textual information about a desired subject. In many instances, the resulting Web page will include not only the desired textual information, but also secondary information such as advertisements, images, videos, and unrelated articles or text. This secondary information is often rendered with the Web page for a payment to the primary entity associated with the Web page. The network service provider that provides the party requesting the Web page with access to the Internet does not receive any direct benefit for providing the secondary information with the requested Web page.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer-readable media are provided herein for modifying network source content. According to embodiments described herein, a request for the source content is received from a user device. As a result, the source content is retrieved from a corresponding network element. The source content includes primary source content and secondary source content. After identifying the secondary source content, insertion content is retrieved and used to modify the secondary source content. The source content containing the modified secondary source content is then provided to the user device. According to various embodiments, the source content may include a Web page and the insertion content may be selected using content management criteria associated with a user requesting the source content.

Other apparatus, systems, methods, and/or computer program products according to embodiments will be or become apparent to one with skill in the art upon review of the following drawings and Detailed Description. It is intended that all such additional apparatus, systems, methods, and/or computer program products be included within this description, be within the scope of the present invention, and be protected by the accompanying claims.

DETAILED DESCRIPTION

The following detailed description is directed to methods, systems, and computer-readable media for modifying network source content. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

As discussed briefly above, when a user accesses a Web page or other information over the Internet or other network, the Web page commonly contains advertisements and other secondary source content that may not directly pertain to the primary source content that the user is interested in. Advertisers and others pay premiums to utilize the space on the Web page to advertise a product or service or to provide any other type of secondary source content to the user. The network service provider that provides the user with access to the Internet or other network enables the user to receive the Web page and view the content, including the secondary source content. Embodiments of the disclosure described herein allow the network service provider to manage the secondary source content on a Web page or other document, including replacing the original secondary source content with new content or modifying the secondary source content with new content using the various methods described below.

As an example, according to embodiments described herein, when the user requests a Web page, rather than viewing the Web page with four advertisements as originally intended by the Web page provider, the Web page that is rendered for the user may have two different advertisements and two personal photographs that replace the original four advertisements. For illustrative purposes, throughout this disclosure, the various embodiments will be described in the context of a user requesting and receiving a Web page via the Internet. However, it should be understood that the embodiments described herein are equally applicable to any type of document or other content received via any type of network.

Figure 1:
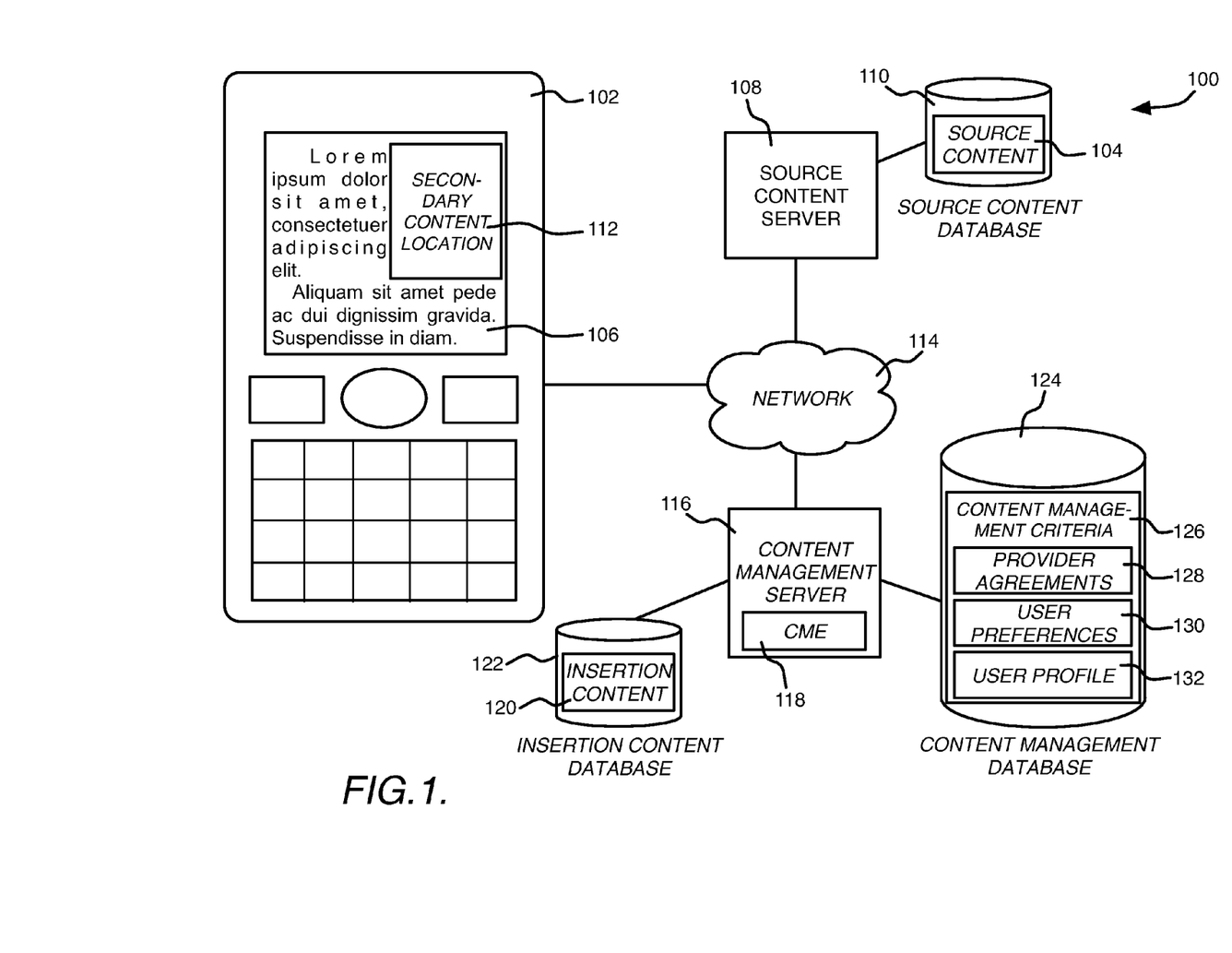
FIG. 1 is a block diagram showing elements of an illustrative network source content modification system according to various embodiments presented herein.

In the following detailed description, references are made to the accompanying drawings that form a part hereof, and which are shown by way of illustration specific embodiments or examples. Referring now to the drawings, in which like numerals represent like elements through the several figures, aspects of a network source content modification system will be described. FIG. 1 shows various elements of a network source content modification system 100 according to embodiments described herein. The network source content modification system 100 includes a user device 102, a source content server 108, a source content database 110, a content management server 116, an insertion content database 122, and a content management database 124.

The user device 102 may be any type of computing device capable of receiving content from a network 114 and providing the content to the user. Examples include but are not limited to a cellular telephone, a personal data assistant, a personal computer, a television, a set-top television box, Internet Protocol Television (IPTV), and a video game console. According to one embodiment, the user device 102 is a cellular telephone or personal data assistant having a display 106 for rendering a Web page for the user. According to this embodiment, the Web page is rendered utilizing source content 104 associated with the Web page. The source content 104 includes all of the content to be used to render the requested Web page, including text, images, video, audio, and other media.

As will be described in greater detail below with respect to FIG. 2, the source content 104 may include primary source content and secondary source content. The primary source content includes the substantive information related to the desired Web page, while the secondary source content includes all secondary information that may be modified without impacting the substantive information on the Web page. For example, the text of an article on a Web page would be considered primary source content, while an advertisement on the same Web page would be secondary source content since it could be replaced or modified without impacting the article that is the main focus of the Web page. Throughout this disclosure, "secondary source content" refers to the secondary content as it exists within the source content 104 and "secondary content" refers to the secondary content as displayed on the user device 102, which may be the secondary source content with or without modification. As seen in FIG. 1, the Web page rendered on the display 106 of the user device 102 includes an article and a secondary content location 112. The secondary content location 112 defines a location for an advertisement, image, or any other appropriate secondary content.

The source content 104 is stored in the source content database 110 associated with the source content server 108. It should be appreciated that the source content 104, particularly when the source content 104 is a Web page, may be stored in various databases and locations connected to the network 114. Web pages are often made up of multiple components stored in multiple locations. The hypertext mark-up language (HTML) instructions corresponding to the Web page directs the Web browser in the user device 102 to retrieve the constituent components of the Web page from their applicable locations on the network 114 and to combine them in a particular manner to render the Web page. Accordingly, it should be understood that the source content database 110 may include multiple databases associated with multiple source content servers 108.

In a typical scenario in which the user views a Web page, the user enters a URL associated with the desired Web page into the user device, or by selecting a hypertext link associated with the Web page. In either situation, the Web browser 204 (shown in FIG. 2) establishes a connection with the source content server 108 and requests the content of the Web page from the corresponding Web server 206 (shown in FIG. 2). All text, images, video, audio, and other media associated with the requested Web page are retrieved and used by the Web browser 204 to render the Web page. However, according to embodiments of the disclosure presented herein, the source content 104 associated with the Web page is retrieved by a content management engine 118 executing on the content management server 116 prior to providing the source content 104 to the Web browser 204 of the user device 102.

The content management engine 118 may include software and/or hardware and is operative to modify the source content 104 in the various manners described below. While the content management engine 118 is shown to be executing on the content management server 116, the content management engine 118 may alternatively execute on the user device 102, or in combination with an application on the user device 102. The content management engine 118 utilizes insertion content 120 stored in the insertion content database 122 to modify the source content 104. In doing so, the content management engine 118 must identify portions of the source content 104 to be modified and then select the appropriate insertion content 120 and method of modification. Content management criteria 126 guides the content management engine 118 through this source content modification process.

The content management criteria 126 includes provider agreements 128, user preferences 130, and a user profile 132, among others. The provider agreements 128 include contracts between the network service provider, or other entity operating the content management engine 118, and third parties associated with the source content 104. Because the embodiments described herein enable the network service provider to modify the source content 104 before providing it to the requesting user device 102, the providers of the source content 104 may have an interest in entering into an agreement with the network service provider that defines what quantity and type of source content 104, if any, may be modified, and under which circumstances any modification may or may not be made to the source content 104. For example, the providers of the content on a particular Web page may pay a subscription fee that ensures that none of the source content 104 is modified during peak business hours, and that only a particular interstitial advertisement and a particular banner advertisement on the Web page are modified during off-peak hours. The content management engine 118 complies with any applicable provider agreements 128 prior to modifying any of the source content 104.

The content management engine 118 additionally utilizes any quantity and type of user preferences 130 in the source content modification process. As will be described in greater detail below, the user preferences include historical data collected during the past viewing of source content 104. For example, whenever the user views a Web page on the user device 102, an application on the user device or the content management engine 118 may track the types of advertisements or other secondary information that the user clicks on to obtain further information. Similarly, the content management engine 118 can collect user preferences 130 associated with pausing and rewinding a digital video recorder to re-watch a particular type of commercial or other television broadcast content.

The user preferences 130 may additionally or alternatively include data corresponding to the likes and dislikes of the user with respect to particular types of content according to user ratings and/or votes. For example, the user may press a thumbs-up, checkmark, or other affirmative button on a remote control when the user is viewing content that is particularly attractive to the user, while pressing a thumbs-down, "X," or other negatively associated button on a remote control when the user is viewing content that is not attractive to the user. These voting actions, whether physical voting by the user, or through tracking the viewing habits of the user, may be stored and analyzed by the content management engine 118 to arrive at user preferences 130 that may be used to assist in the selection of source content 104 components to be modified, the selection of insertion content 120 to insert into the source content 104, and/or the determination as to how the source content 104 should be modified.

In addition to the provider agreements 128 and the user preferences 130, the content management engine 118 may utilize any quantity and type of information stored in a user profile 132 within the content management database 124. The user profile 132 may be established by the user upon the initiation of a service agreement with the network service provider or at any time thereafter. The user profile 132 may include any information supplied by the user corresponding to the user's preferred amount of secondary content supplied with the source content 104, preferred type of secondary content supplied with the source content 104, preferred type of desired insertion content, and criteria defining when and how the source content is to be modified, among other information.

Additionally, the information within the user profile 132 may be used according to the terms of a user subscription purchased by the user that defines the amount of control that the user has in modifying the source content 104. For example, the user may pay a premium for a subscription that allows the user to dictate exactly how the source content is to be modified, including providing the requested source content 104 to the user device 102 without modification, removing all secondary source content from the source content 104, or modifying any amount of secondary source content within the source content 104 with insertion content 120 according to criteria within the user profile 132. It should be appreciated that any amount and type of content management criteria 126 may be utilized by the content management engine 118 without departing from the scope of this disclosure.

According to one embodiment, the insertion content 120 is stored within the insertion content database 122. The insertion content database 122 may be a separate database as shown, may be part of the content management server 116, may be combined with the content management database 124, may be a part of or associated with the user device 102, or may be any number of additional databases located anywhere on the network 114. The insertion content 120 may be any type of content, including text, images, video, audio, and other media. Additionally, the insertion content 120 may be commercial content such as advertisements or may be personal content such as personal photographs or videos. For example, the user may subscribe to a network service provider plan that allows him to dictate which insertion content 120 to use when modifying the source content 104. The user may dictate that personal photographs or video be used as the insertion content 120 so that a Web page appears with personal photographs or other designated insertion content 120 rather than advertisements. In this embodiment, it should be appreciated that the insertion content 120 may be retrieved from the user device 102 rather than from the insertion content database 122. Similarly, in this embodiment, the content management engine 118 may be executing on the user device 102 or both on the user device 102 and on the content management server 116.

The elements of the network source content modification system 100 communicate with one another via the network 114. It should be appreciated that the network 114 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. The network 114 may also be a wired network such as, but not limited to, a wired Wide Area Network (WAN), a wired Local Area Network (LAN) such as the Ethernet, a wired Personal Area Network (PAN), or a wired Metropolitan Area Network (MAN). As discussed above, according to embodiments described herein, the network 114 includes the Internet such that the network communications occur via wireless or wired connections to the Internet.

Figure 2:
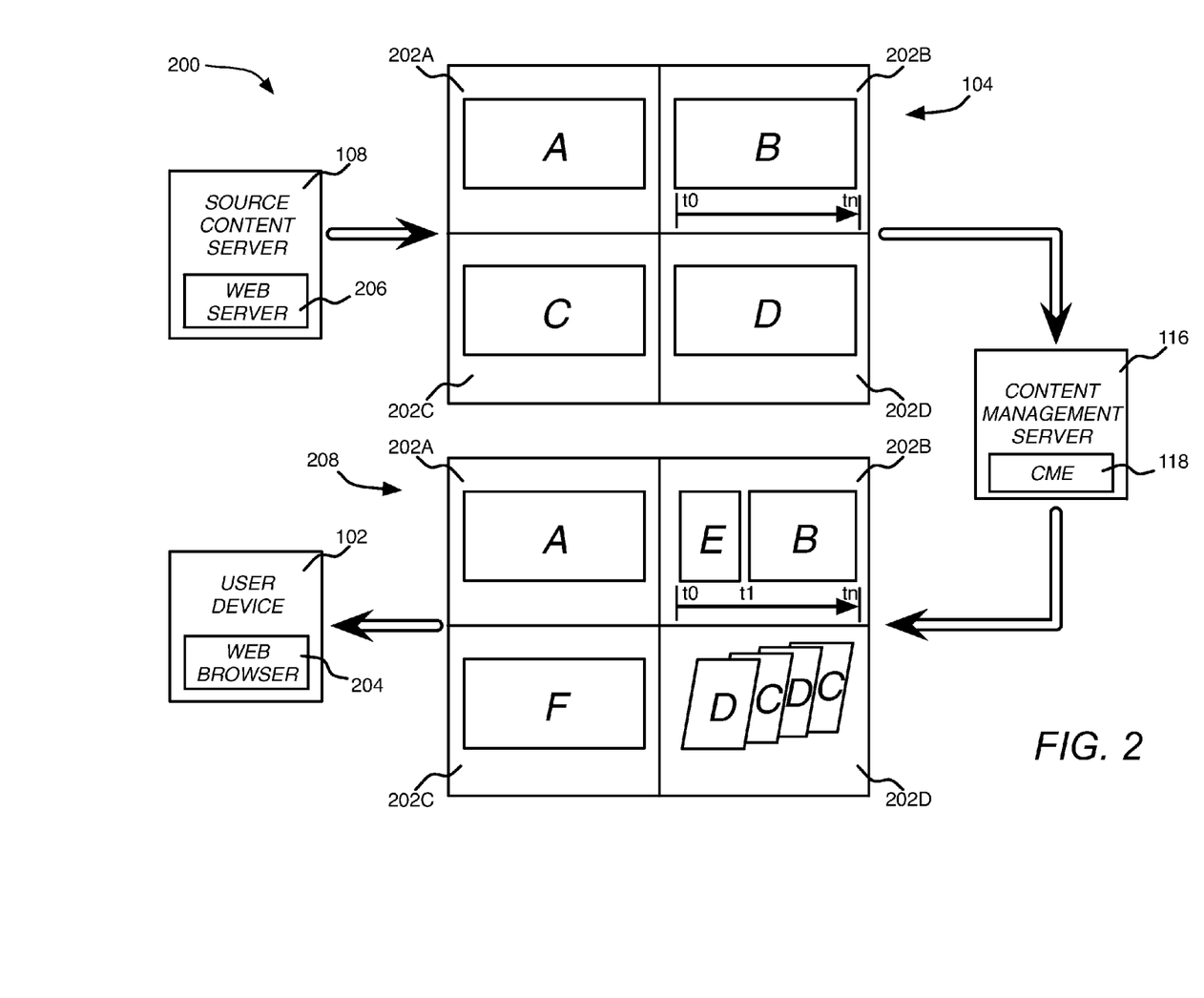
FIG. 2 is a block diagram showing an illustrative example of source content modification according to various embodiments presented herein.

Turning now to FIG. 2, an illustrative example of a source content modification process 200 according to various embodiments will be described. The example source content modification process 200 begins with the Web server 206 of the source content server 108 providing the requested source content 104. It should be appreciated that the source content 104 includes all of the primary source content and secondary source content, or links or pointers to the primary and secondary source content, as well as rendering instructions that allow the Web browser 204 of the user device 102 to correctly render the requested Web page. For illustrative purposes, FIG. 2 shows the source content 104 as having four content locations 202A-202D on the resulting Web page corresponding to four instances of secondary source content A-D, without showing the primary source content.

For example, a rendered Web page utilizing the source content 104 would have a content location 202A on the Web page that contains the secondary source content A, which may be an image, text, or any type of media. Similarly, the rendered Web page would have a content location 202B that contains the secondary source content B. The arrow shown under the secondary source content B shows that the secondary source content B has a time component attached. For example, the secondary source content B may be a video that plays for a predetermined time, from time $t_0$ to time $t_n$, when the corresponding Web page is displayed. Alternatively, the secondary source content B may be an interstitial advertisement that is displayed for a predetermined period of time $t_n$. The content locations 202C and 202D correspond to the instances of the secondary source content C and D, respectively.

According to embodiments described herein, when the Web browser 204 requests the source content 104 from the Web server 206, the content management engine 118 intercepts the source content 104 to modify the source content 104 prior to delivery to the Web browser, if applicable. After analyzing the source content 104 and the content management criteria 126, the content management engine 118 provides modified source content 208 to the Web browser 204 for rendering the requested Web page. Looking at the modified source content 208, the secondary source content A within the content location 202A remained unmodified. However, insertion content E was prepended to the secondary source content B at the content location 202B. As a result, the insertion content E will be played or displayed for a portion of time $t_1$ prior to playing or displaying the secondary source content B.

There are several ways that the insertion content E may be prepended to the secondary source content. First, the insertion content E may be prepended such that the total time $t_n$ lengthens by the duration of time $t_1$ that the insertion content E is displayed. For example, assume that the secondary source content B is a ten-second video that plays when the corresponding Web page is displayed on the user device 102 and that the insertion content E is an image. The content management engine 118 may modify the source content 104 so that the image (insertion content E) is displayed at the content location 202B for four seconds before being replaced by the secondary source content B, which subsequently plays for the full ten-second duration. Doing so provides secondary content for fourteen total seconds at the content location 202B.

In this example, the secondary source content B is buffered for four seconds while the insertion content E is displayed. This buffering of the source content 104 while the insertion content 120 is displayed may be applied to all of the source content 104 such that the content management engine 118 buffers all of the secondary source content for a given period of time while providing the insertion content 120 for display during the buffering period. Similarly, the content management engine 118 may buffer all of the source content 104 for the given period of time while providing the insertion content 120 for interstitial display prior to displaying the requested Web page.

A second method for prepending the insertion content E to the secondary source content B includes prepending the insertion content E such that the total time $t_n$ remains the same. Doing so requires that the content management engine 118 modify the secondary source content B to provide for the shortened playback duration $t_1$ to $t_n$ from the original playback duration of $t_0$ to $t_n$. The content management engine 118 may do so by either truncating a portion of the secondary source content B corresponding to the duration of time $t_1$ that the insertion content E is displayed, or by increasing the playback speed of the secondary source content B to allow for the duration of time $t_1$ that the insertion content E is displayed.

Looking at the content location 202C in the modified source content 208, the content management engine 118 has replaced the secondary source content C with the insertion content F. However, rather than removing the secondary source content C from the source content 104, the content management engine 118 has moved the secondary source content C to the content location 202D. At the content location 202D, the content management engine 118 instructs the Web browser to alternately display the secondary source content D and the secondary source content C. In this situation, the secondary source content C acts as insertion content 120 and is used to modify the source content 104. It should be understood that FIG. 2 and the corresponding description provided herein provide only a limited number of ways in which the source content 104 may be modified. Any method of modifying the source content 104, with or without the use of the insertion content 120, may be used without departing from the scope of this disclosure.

Figure 3A:
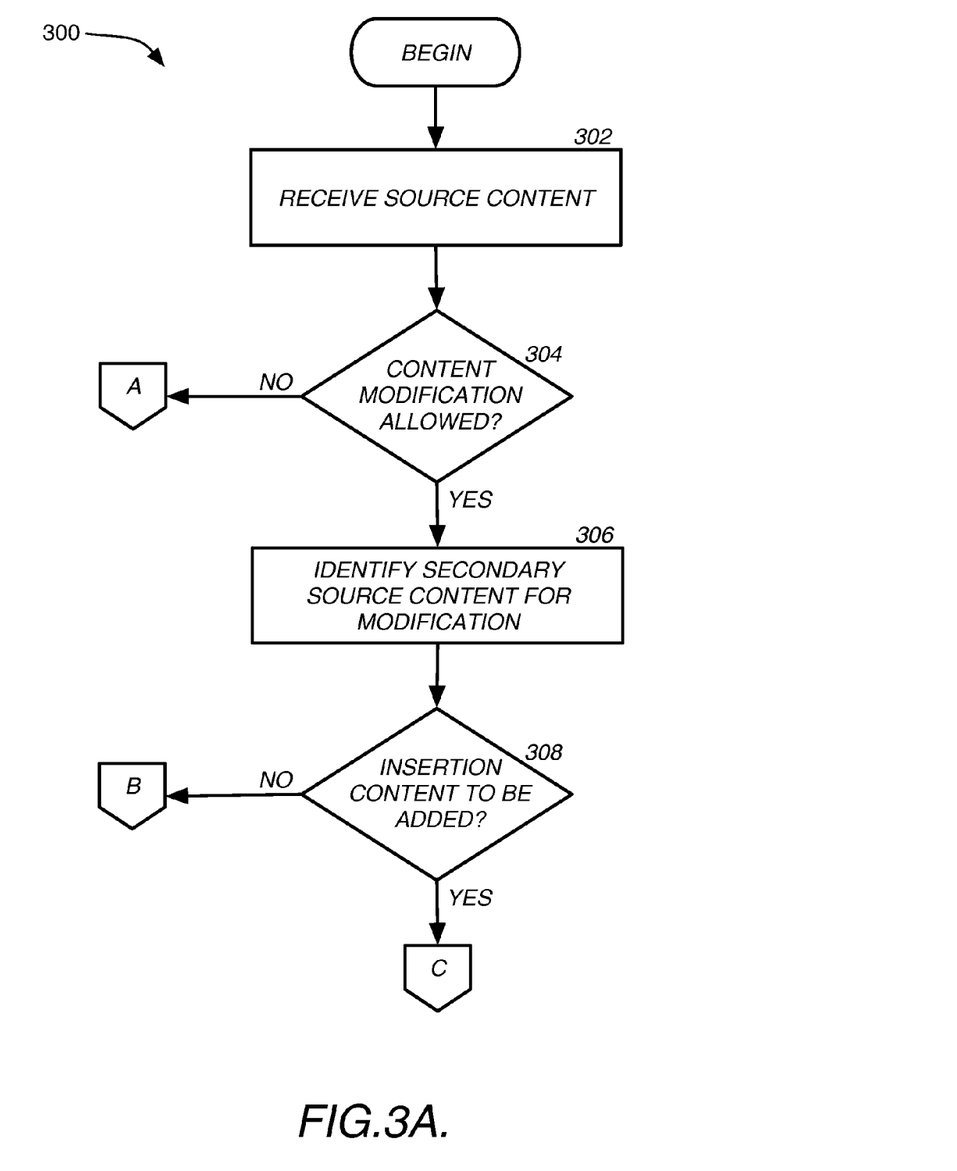
FIGS. 3A and 3B are flow diagrams illustrating a method for modifying network source content according to various embodiments presented herein.
Figure 3B:
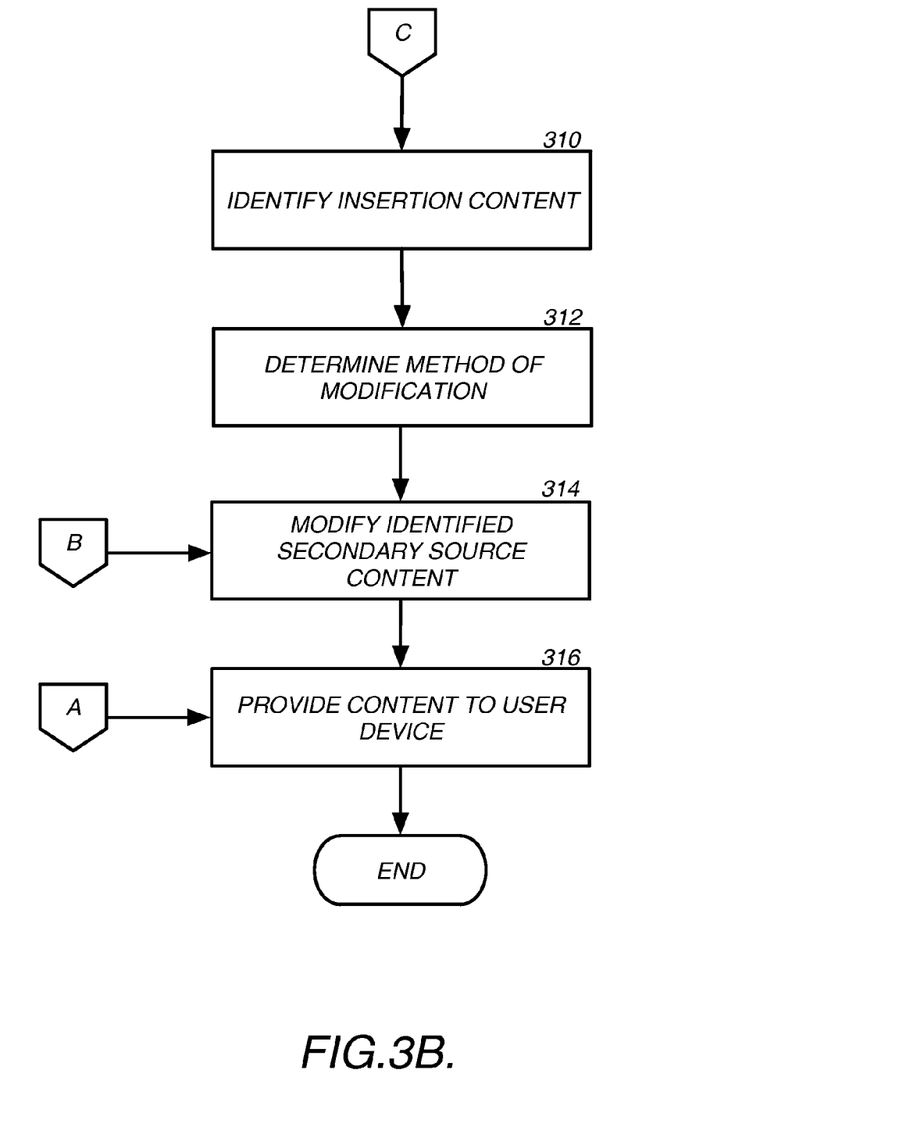

Turning now to FIGS. 3A and 3B, an illustrative routine 300 will be described for providing network source content modification according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 300 begins at operation 302, where the content management engine 118 receives the source content 104. As described above, the receipt of the source content 104 may be as a result of a request from the user device 102. The request may be made directly to the source content server 108, in which case the content management engine 118 intercepts the source content 104 before it is provided to the user device 102. Alternatively, the request for the source content 104 may be made to the content management server 116, which then requests the source content 104 from the source content server 108. From operation 302, the routine 300 continues to operation 304, where the content management engine 118 determines whether modification of the source content 104 is allowed. The content management engine 118 utilizes the content management criteria 126 to make this determination. As previously described, the applicable provider agreement 128, user profile 132, and/or user subscription may prohibit the content management engine 118 from modifying the source content 104. If modification of the source content 104 is not allowed, then the routine 300 proceeds to operation 316, where the source content 104 is provided to the user device 102 and the routine 300 ends.

However, if at operation 304, the content management engine 118 determines that modification of the source content 104 is permitted according to the content management criteria 126, then the routine 300 continues to operation 306, where the content management engine 118 identifies the secondary source content that is to be modified. As discussed above, the content management criteria 126 may dictate the type and quantity of secondary source content that is to be modified. Alternatively, the content management engine 118 may utilize known techniques for distinguishing secondary source content, such as advertisements, from the primary source content. Such techniques include but are not limited to the recognition of tags or other metadata embedded within the source content 104, image recognition for identifying particular images or objects to be modified, and distinguishing secondary source content from the primary source content through identifying differences in luminance, chrominance, spatial, or temporal characteristics within the source content 104.

It should be understood that modification of the secondary source content as described herein may apply to specific components within the secondary source content as opposed to complete removal or replacement of the secondary source content. For example, secondary source content may include audio, video, images, or any other type of media and may be component-based, packet-based, or any other multimedia container format. Accordingly, a component of the secondary source content may be modified, or a new component introduced. MPEG-4 is an example media standard that utilizes a container file format that allows for media components to be incorporated into secondary source content utilizing an MPEG-4 format. As an example, assume that the source content 104 includes secondary source content that utilizes the MPEG-4 standard and includes an audio component and a JPEG image component. The audio component may be replaced with an alternative audio component, the JPEG image component may be replaced with an alternative video component, and an additional JPEG image component may be inserted into the MPEG-4 media that was not present when received.

Returning to FIG. 3A, the routine 300 continues from operation 306 to operation 308, where the content management engine 118 determines whether insertion content 120 is to be added. For example, the applicable content management criteria 126 may dictate that the source content 104 is to be modified by removing secondary source content or by modifying secondary source content without utilizing insertion content 120 that was not included with the original source content 104. In this situation, the routine 300 proceeds to operation 314, where the content management engine 118 modifies the identified secondary source content. The routine 300 continues from operation 314 to operation 316, where the content management engine 118 provides the modified source content 208 to the user device 102, and the routine 300 ends.

However, if at operation 308, the content management engine 118 determines that insertion content 120 is to be added to the source content 104, then the routine 300 continues to operation 310, where the content management engine 118 identifies the applicable insertion content 120. As described above, the insertion content 120 used to modify the source content 104 may be selected according to the content management criteria 126. The insertion content 120 may be selected to best target or appeal to the user associated with the user device 102, particularly when the insertion content 120 includes advertisements. Any known targeting techniques may be used, including but not limited to using user demographic data, the geographic location of the user device 102, and the purchasing and content viewing habits and preferences of the user. This information may be located in the user profile 132 and/or stored in the user preferences 130.

Moreover, the insertion content 120 may be selected according to the technological capabilities of the user device. For example, if the user device is not capable of displaying multimedia, then the content management engine 118 will not select insertion content 120 that includes multimedia content. The content management engine 118 may additionally select insertion content 120 according to themes. For example, the user profile 132 and/or the user preferences 130 may indicate that the user is interested in hang gliding. As a result, the content management engine 118 may select advertisements, photographs, and video related to hang gliding for insertion into the source content 104.

From operation 310, the routine 300 continues to operation 312, where the content management engine 118 determines one or more methods for modifying the source content 104. As discussed above, methods include but are not limited to removing secondary source content, modifying one or more component of the secondary source content, replacing the secondary source content with insertion content, prepending the insertion content 120 to the secondary source content, moving the secondary source content to another secondary content location 112, and alternating between displaying the secondary source content and the insertion content 120. The routine continues from operation 312 to operation 314, where the content management engine 118 modifies the identified secondary source content using any applicable methods. From operation 314, the routine 300 continues to operation 316, where the content management engine 118 provides the modified source content 208 to the user device 102 for display to the user, and the routine 300 ends.

Figure 4:
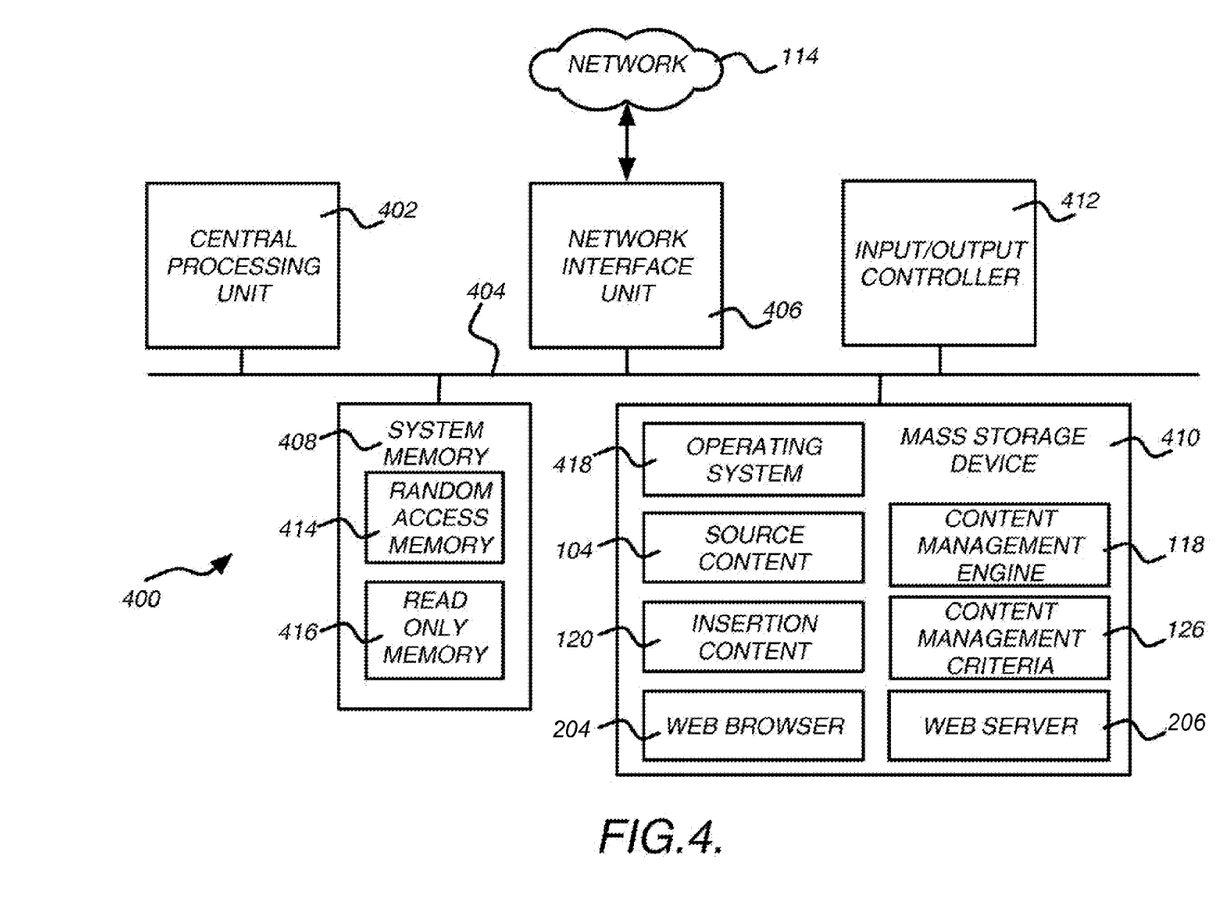
FIG. 4 is a computer architecture diagram showing a computer architecture suitable for implementing the various computer systems described herein.

Referring now to FIG. 4, an illustrative computer architecture for a computer 400 utilized in the various embodiments presented herein will be discussed. The computer architecture shown in FIG. 4 illustrates a conventional desktop, laptop computer, or server computer. Specifically, the computer 400 illustrates the computer architecture associated with the user device 102 or the content management server 116. The computer architecture shown in FIG. 4 includes a central processing unit 402 (CPU), a system memory 408, including a random access memory 414 (RAM) and a read-only memory (ROM) 416, and a system bus 404 that couples the memory to the CPU 402. A basic input/output system (BIOS) containing the basic routines that help to transfer information between elements within the computer 400, such as during startup, is stored in the ROM 416. The computer 400 further includes a mass storage device 410 for storing an operating system 418, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through the network 114. As described above with respect to FIG. 1, the network 114 may include a wireless network such as, but not limited to, a WLAN such as a WI-FI network, a WWAN, a WPAN such as BLUETOOTH, a WMAN such a WiMAX network, a cellular network, or a satellite network. Alternatively, the network 114 may be a wired network such as, but not limited to, a wired WAN, a wired LAN such as the Ethernet, a wired PAN, or a wired MAN. The network 114 may include the Internet such that the elements of the network source content modification system 100 communicate with one another via wireless or wired connections to the Internet.

The computer 400 may connect to the network 114 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including the operating system 418 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 410 and RAM 414 may also store one or more program modules. In particular, the mass storage device 410 and the RAM 414 may store the source content 104, the content management engine 118, the insertion content 120, the content management criteria 126, the Web browser 204, and the Web server 206, as well as any other program modules described above with respect to FIG. 1. Based on the foregoing, it should be appreciated that apparatus, systems, methods, and computer-readable media for modifying network source content are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for modifying source content, the method comprising:
   receiving, at a processor, a request from a user device for a World Wide Web page stored in a content storage device, the request comprising a uniform resource locator for the World Wide Web page;
   upon receiving the request, retrieving, by the processor, the World Wide Web page from the content storage device using the uniform resource locator, the World Wide Web page comprising substantive information provided by an information provider and a first advertisement positioned at a first location within the World Wide Web page and a second advertisement positioned at a second location within the World Wide Web page, the first advertisement and the second advertisement provided by a third-party advertiser, the first advertisement and the second advertisement existing along with the substantive information within the World Wide Web page, wherein the first advertisement and the second advertisement are configured to be modified utilizing insertion content;
   upon retrieving the World Wide Web page and prior to providing the World Wide Web page to the user device, identifying, by the processor, the first advertisement and the second advertisement existing within the World Wide Web page for modification;
   upon identifying the first advertisement and the second advertisement and prior to providing the World Wide Web page to the user device, retrieving, by the processor, the insertion content provided by a telecommunications service provider of the user device, the insertion content configured to modify the first advertisement and the second advertisement, wherein the telecommunications service provider is separate from the third-party advertiser;
   upon retrieving the insertion content and prior to providing the World Wide Web page to the user device, modifying, by the processor, the first advertisement and the second advertisement existing within the World Wide Web page with the insertion content to form a modified World Wide Web page, the modified World Wide Web page comprising the substantive information and the first advertisement and the second advertisement modified with the insertion content, wherein modifying the first advertisement and the second advertisement to form the modified World Wide Web page comprises
      moving the first advertisement from the first location within the World Wide Web page to the second location within the World Wide Web page,
      providing instructions to alternately display the first advertisement and the second advertisement at the second location within the World Wide Web page, and
      inserting the insertion content at the first location within the World Wide Web page; and
   providing, by the processor, the modified World Wide Web page to the user device in response to the request.

2. The method of claim 1, wherein receiving a request from the user device for the World Wide Web page comprises receiving the uniform resource locator associated with the World Wide Web page from a web browser of the user device.

3. The method of claim 1, wherein identifying the first advertisement and the second existing within the World Wide Web page for modification comprises identifying a first multimedia component and a second multimedia component of the World Wide Web page.

4. The method of claim 1, wherein identifying the first advertisement and the second advertisement existing within the World Wide Web page for modification comprises identifying the first advertisement and the second advertisement according to a provider agreement.

5. The method of claim 1, wherein retrieving insertion content comprises determining the insertion content according to preferences of a user of the user device.

6. The method of claim 1, further comprising retrieving content management criteria, wherein identifying the first advertisement and the second advertisement from the World Wide Web page for modification comprises utilizing the content management criteria to identify the first advertisement and the second advertisement from the World Wide Web page for modification, and wherein retrieving insertion content comprises utilizing the content management criteria to identify and retrieve the insertion content.

7. The method of claim 6, wherein the content management criteria comprises user preferences and terms of a user subscription.

8. A non-transitory computer-readable storage medium having computer-executable instructions stored thereon which, when executed by a computer, cause the computer to perform operations comprising:

receiving a request from a user device for a World Wide Web page stored in a content storage device, the request comprising a uniform resource locator for the World Wide Web page;

upon receiving the request, retrieving the World Wide Web page from the content storage device using the uniform resource locator the World Wide Web page comprising substantive information related to the world wide web page and a first advertisement positioned at a first location within the World Wide Web page and a second advertisement positioned at a second location within the World Wide Web page, the first advertisement and the second advertisement existing along with the substantive information within the World Wide Web page, wherein the first advertisement and the second advertisement are configured to be modified utilizing insertion content and wherein the substantive information is provided by an information provider and the first advertisement and the second advertisement are provided by a third-party advertiser;

upon retrieving the World Wide Web page and prior to providing the World Wide Web page to the user device, identifying the first advertisement and the second advertisement existing within the World Wide Web page for modification;

upon identifying the first advertisement and the second advertisement and prior to providing the World Wide Web page to the user device, retrieving the insertion content provided by a telecommunications service provider of the user device, the insertion content configured to modify the first advertisement and the second advertisement, wherein the telecommunications service provider is separate from the third-party advertiser;

upon retrieving the insertion content and prior to providing the World Wide Web page to the user, modifying the first advertisement and the second advertisement existing within the World Wide Web page with the insertion content to form a modified World Wide Web page, the modified World Wide Web page comprises the substantive information and the first advertisement and the second advertisement modified with the insertion content, wherein modifying the first advertisement and the second advertisement to form the modified World Wide Web page comprises:

moving the first advertisement from the first location within the World Wide Web page to the second location within the World Wide Web page,    providing instructions to alternately display the first advertisement and the second advertisement at the second location within the World Wide Web page, and    inserting the insertion content at the first location within the World Wide Web page; and providing, the modified World Wide Web page in response to the request.

9. The non-transitory computer-readable storage medium of claim 8, wherein receiving the request from the user device for the World Wide Web page comprises receiving uniform resource locator associated with the World Wide Web world page from a web browser of the user device.

10. The non-transitory computer-readable storage medium of claim 8, wherein the insertion content is associated with a theme determined from a user profile of a user of the user device.

11. The non-transitory computer-readable storage medium of claim 8, wherein retrieving insertion content comprises determining the insertion content according to technological capabilities of the user device.

12. The non-transitory computer-readable storage medium of claim 8, wherein retrieving the insertion content comprises determining the insertion content according to user preferences created from voting actions of a user of the user device.

13. A system for modifying source content, comprising:

a processor; and a memory comprising instructions that, when executed by the processor, cause the processor to perform operations comprising:

receiving a request from a user device for a World Wide Web page stored in a content storage device, the request comprising a uniform resource locator for the World Wide Web page,    upon receiving the request, retrieving World Wide Web page from the content storage device using the uniform resource locator, the World Wide Web page comprising substantive information related to the World Wide Web page and a first advertisement positioned at a first location within the World Wide Web page and a second advertisement positioned at a second location within the World Wide Web page, the first advertisement and the second advertisement existing along with the substantive information within the World Wide Web page, wherein the first advertisement and the second advertisement are configured to be modified utilizing insertion content, wherein the substantive information is provided by an information provider and the first advertisement and the second advertisement are provided by an third-party advertiser,    upon retrieving the World Wide Web page and prior to providing the World Wide Web page to the user device, identifying the first advertisement and the second advertisement existing within the World Wide Web page for modification,    upon identifying the first advertisement and the second advertisement and prior to providing the World Wide Web page to the user device, retrieving the insertion content provided by a telecommunications service provider of the user device, the insertion content configured to modify the first advertisement and the second advertisement, wherein the telecommunications service provider is separate from the third-party advertiser    upon retrieving the insertion content and prior to providing the World Wide Web page to the user, modifying the first advertisement and the second advertisement existing within the World Wide Web page with the insertion content to form a modified World Wide Web page, the modified World Wide Web page comprising the substantive information and the first advertisement and the second advertisement modified with the insertion content, wherein modifying the first advertisement and the second advertisement to form the modified World Wide Web page comprises      moving the first advertisement from the first location within the World Wide Web page to the second location within the World Wide Web page,      providing instructions to alternately display the first advertisement and the second advertisement at the second location within the World Wide Web page, and      inserting the insertion content at the first location within the World Wide Web page, and    providing the modified World Wide Web page in response to the request.

14. The system of claim 13, wherein receiving the request from the user device for the World Wide Web page comprises receiving the uniform resource locator associated with the World Wide Web page from a web browser of the user device.

15. The system of claim 14, wherein identifying the first advertisement and the second advertisement existing within the World Wide Web page for modification comprises utilizing a provider agreement to select the first advertisement and the second advertisement for modification.

* * * * *